United States Patent [19]

Sims

[11] 4,104,220

[45] Aug. 1, 1978

[54] ALKENYL 1-(2-AMINOETHYL) ALKYLENEUREIDO SUCCINAMATES, THEIR SYNTHESIS, AND USE IN AQUEOUS EMULSION POLYMER SYSTEMS

[75] Inventor: Victor A. Sims, Bayonne, N.J.

[73] Assignee: Air Products & Chemicals, Inc., Allentown, Pa.

[21] Appl. No.: 709,916

[22] Filed: Jul. 29, 1976

[51] Int. Cl.² ............................................. C08L 39/04
[52] U.S. Cl. .......................... 260/29.6 R; 260/29.6 T; 548/320
[58] Field of Search ...................... 260/29.6 R, 29.6 T; 548/320

[56] References Cited

U.S. PATENT DOCUMENTS

| | | | |
|---|---|---|---|
| 2,831,833 | 4/1958 | Aycock et al. | 548/320 |
| 2,881,155 | 4/1959 | Hankins | 548/320 |
| 3,462,385 | 8/1969 | Barabas et al. | 260/29.6 R |

*Primary Examiner*—M. J. Welsh
*Attorney, Agent, or Firm*—William F. Marsh; Barry Moyerman

[57] ABSTRACT

Novel compounds of the general formula

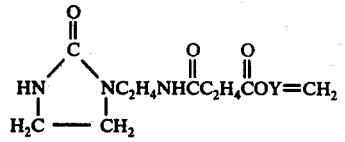

wherein Y is

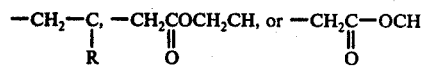

and R is H or $CH_3$; are produced by reacting 2-aminoethyl ethylene urea with succinic anhydride, and further reacting the potassium salt of the obtained compound with an appropriate allyl halide or with allyl chloroacetate or vinyl chloroacetate respectively. The recovered alkenyl succinamic ureido compounds find particular use as functional comonomers for imparting wet adhesion properties to emulsion systems containing vinyl ester polymers used in paints and coating compositions.

12 Claims, No Drawings

ALKENYL 1-(2-AMINOETHYL) ALKYLENEUREIDO SUCCINAMATES, THEIR SYNTHESIS, AND USE IN AQUEOUS EMULSION POLYMER SYSTEMS

BACKGROUND OF THE INVENTION

1. Field of the Invention

This invention relates generally to new N-(cyclic ureido) alkyl amino derivatives wherein the amino nitrogen is attached by a carbonyl-containing chain to a terminal ethylenically unsaturated group. More particularly, the invention is concerned with preparation of novel compounds of the general formula

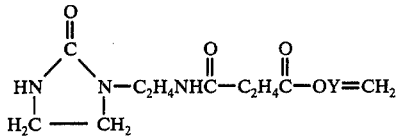

wherein Y is

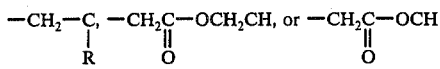

and R is H or methyl. These compounds can be regarded as N-ethylamino derivations of imidazolidinone. They are particularly useful, among other purposes, as functional monomers for imparting excellent wet adhesion properties to water-based paints and coating compositions comprising vinyl ester emulsions.

2. Prior Art

The prior art discloses a wide variety of unsaturated derivatives of N-(omega-aminoalkyl) cyclic ureidos capable of undergoing condensation and polymerization reactions. Certain of such compounds are indicated, among other suggested uses, as additives to paper sizing and coating formulations for improving wet strength, as anti-static additives, and as components of water-based paints and coatings to improve freeze-thaw stability, and adhesion to various substrates including weathered and chalky surfaces or glossy oil-painted surfaces. Typical examples of these prior art disclosures and of the various types of compounds suggested, are found in U.S. Pat. Nos. 2,881,155; 2,980,652; 3,194,792; 3,280,034; 3,300,429; 3,369,008; and 3,509,085.

The compounds of the present invention differ from those heretofore disclosed in the prior art, in a number of important respects as will hereinafter appear.

SUMMARY OF THE INVENTION

It has now been found that vinyl, allyl and methallyl esters of N-ethyl-β-(ethylene ureido) succinamic acid can be readily prepared in good yield and desired purity by methods hereinafter described. These compounds, in contrast to the ureido derivatives of the prior art, are characterized by the presence in the carbonyl-containing chain attached to the amino nitrogen of the aminoalkylureide, of a terminal ethylene group not directly attached to the carbonyl carbon. These novel compounds are prepared by reaction of the previously formed potassium salt of N-ethyl-β-(ethylene ureido) succinamic acid with an allyl or methallyl halide, or with an alkenyl ester of chloroacetic acid such as vinyl chloroacetate or allyl chloroacetate.

DESCRIPTION OF PREFERRED EMBODIMENTS

The starting material for preparation of the novel compounds of the present invention is 2-aminoethyl ethylene urea, corresponding to the formula

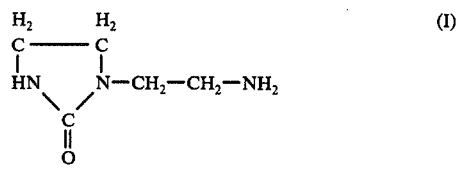

which is available commercially or it can be prepared by methods described in U.S. Pat. No. 2,613,212.

The crude commercial 2-aminoethyl ethylene urea may contain by-products from its synthesis including unreacted diethylene triamine and higher condensates as well as some water. While the crude material can be employed "as is", if desired and as preferred, the higher condensates can be removed by solvent precipitation, which assures better yield and quality of the final desired product. Most of the included contaminants, however, will be retained in the alcohol mother liquor from which the desired potassium salt is crystallized in the subsequent procedure as will hereinafter appear.

The 2-aminoethyl ethylene urea is initially reacted with succinic anhydride in absolute ethyl alcohol forming the amido succinic acid adduct corresponding to the formula

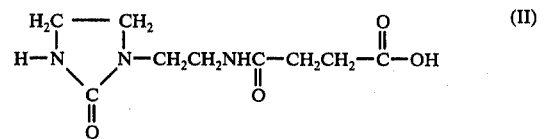

The structure of the compound (II) was confirmed by NMR and elemental analysis.

The succinic acid compound (II) is then neutralized with alcoholic KOH solution and the obtained potassium succinamate salt isolated by filtration and alcohol washed to remove process impurities.

The alcohol wet cake of the isolated potassium salt is then slurried in organic solvent and vacuum topped to remove water and alcohol. Preferably, the product is then further dried to recover the purified salt, which can be employed in any number of useful reactions and particularly by reaction with halided intermediates in reactions splitting out alkali metal halide. If desired, however, the vacuum-topped wet cake may be employed as such. Thus in the case of reaction with allyl chloride:

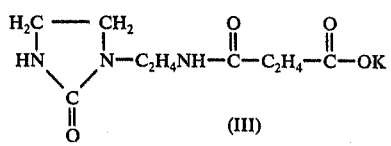

-continued

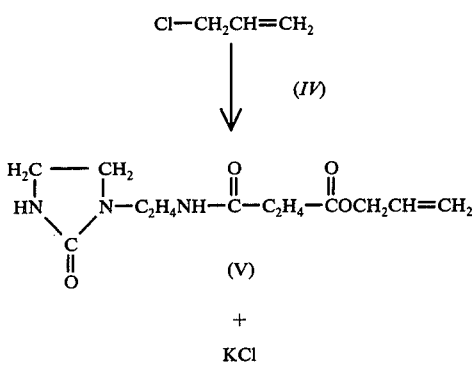

+

KCl

The foregoing reaction is promoted by use of an alkali metal halide activator. The product (V) is recovered in approximately stoichiometric yields (96–98%) as a viscous amber oil. KCl is removed by filtration and the organic solvent is removed by vacuum distillation. The product (V) tested at a 2% level in vinyl acetate copolymer emulsion systems, showed excellent peel adhesion. The obtained copolymer emulsions containing the interpolymerized comonomer (V) also pass the standard cut film scrub test at 5000 cycles.

EXAMPLE 1

(a) Reaction of 2-aminoethyl ethylene urea with succinic anhydride.

Into a resin kettle there was charged under a nitrogen atmosphere, 1170 parts (by weight) of absolute ethyl alcohol, and 713 parts of commercial 2-aminoethyl ethylene urea (of 81.53% purity) in molten state introduced with stirring. It is important that the reaction be carried out in the substantial absence of water. Accordingly, absolute alcohol is employed and the aminoethyl ethylene urea used contains less than about 2% water.

With the mixture in the kettle at 40° C, 537 parts of succinic anhydride flakes were added in portions at a relatively constant rate by means of a powder funnel over a period of about an hour. The amount of succinic anhydride added should be stoichiometrically sufficient to react with the total amine analyzed to be present, if crude aminoethyl ethylene urea is used.

With addition of the succinic anhydride, a mild exotherm results. Accordingly, the reaction vessel is maintained at 45°–52° C by the rate of succinic anhydride addition and by a cooling water bath. It is important that the rate of reaction be controlled during addition of the succinic anhydride to avoid formation of ethyl succinate (by reaction with the alcohol solvent), which otherwise occurs at higher temperatures and/or addition of the succinic anhydride in overly large portions. At temperatures below about 45° C the amount of unreacted succinic anhydride may build up with the possible later occurrence of an uncontrollable exotherm and possible side product formation.

Since components of the reaction mixture pick up water rapidly when exposed to air, it is desirable to maintain a nitrogen blanket during the reaction.

Near the end of the addition of the succinic anhydride, the adduct starts to crystallize, recognized by slurry formation and observed temperature rise due to heat of crystallization. Upon completion of the addition of succinic anhydride, the reaction mixture is heated with stirring for about an hour at 50°–55° C, followed by cooling to 30°–35° C.

(b) Formation of potassium salt.

A fresh solution of a low carbonate alcoholic-KOH is prepared in amount sufficient to neutralize the succinic acid adduct formed in step (a). This solution is slowly added to the reaction kettle containing the succinic acid adduct with stirring the slurry mixture under a nitrogen atmosphere.

As addition of KOH solution is continued, the reaction slurry becomes thinner and complete solution occurs. No heat develops during neutralization, but the mixture tends to cool as a result of dilution. To prevent premature crystallization of the potassium salt of the adduct, the reaction mixture is warmed slightly to maintain a temperature in the range of about 35°–45° C. At or near the end of the addition of the KOH solution, the crystallization of the potassium salt starts as a fine "snowfall". If difficulty is experienced otherwise, initiation of crystallization may be promoted by heating the solution while sparging strongly with nitrogen and/or by seeding.

Once crystallization starts, the solution is stirred slowly under nitrogen while cooling to room temperature over a period of about 2 hours. The fine white salt crystals formed are isolated by suction filtration under a nitrogen atmosphere. Optionally, a basket centrifuge with appropriate filter cloth may be used.

The filter cake is washed with absolute ethyl alcohol to remove entrained amine and until the salt crystals are free of amine odor. A vacuum-dried representative sample should have a fairly sharp melting point (average 205°–207° C). The structure of the potassium salt was verified by NMR and elemental analysis.

(c) Reaction with allyl chloride

Removal of Alcohol. To 1730 parts by weight of the alcohol wet salt from step (b) above (containing about 92.7% solids), there is added 2400 parts of dimethylformamide (DMF) under nitrogen and while stirring at 40°–50° C. Vacuum is then applied to slowly reduce the pressure as the distillation progresses in stages to about 10 mm Hg., thereby removing successively residual alcohol and water and some DMF.

To the remaining slurry of potassium salt in DMF (about 1600 parts of each) maintained with stirring and nitrogen sparging at about 50° C, 36 parts of KBr are added in one shot. Then, there is added over a period of 20–30 minutes 528 parts of allyl chloride (15% excess) while stirring rapidly and gradually increasing pot temperature to 85° C. The reaction temperature is held at 85°–88° C for about three hours to complete the reaction. Completion of the reaction may be determined by the disappearance of allyl chloride (testing aliquot liquid portions of the reaction mixture by gas chromatography) or by chlorine analysis on samples of the insoluble salt. If KBr catalyst is not employed to promote the reaction, a longer cook time than three hours would be required at 85° C.

After reaction is completed, the reaction slurry is cooled to below 40° C and filtered to remove potassium salts. The filter cake is washed twice with fresh DMF to recover the final product (V). Yields averaging 96–98% are normally obtained, based on recovered weight of potassium salts.

If instead of allyl chloride in step (c) above, methallyl chloride is employed as reactant, the corresponding methallyl ester is obtained.

The key to the production of the compounds of the invention is the preparation of the potassium salt intermediate of the ureido succinamate (II) in substantially pure form from aminoethyl ethylene urea. While in the outlined example allyl chloride was employed it will be understood that allyl bromide may be substituted, or methallyl bromide instead of the corresponding chlorides.

While DMF is the highly preferred solvent in the reactions of the potassium salt of the intermediate with allyl or methallyl chloride, other organic solvents may be utilized such as acetonitrile, particularly in reactions employing more active halomonomer intermediates, as in the case of allyl or methallyl bromide as the reactant.

To produce compounds of general formula A corresponding to the structure:

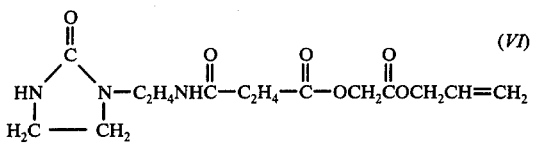

the potassium salt intermediate of formula III is reacted with allyl chloroacetate instead of allyl halide, following generally the same procedure as in the detailed example above. In this reaction acetonitrile is preferably employed as the selective solvent instead of DMF.

Compounds of the general formula A corresponding to the structure:

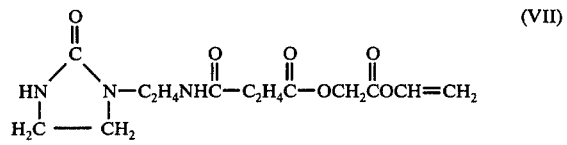

are similarly obtained by reacting the potassium salt intermediate (III) with vinyl chloroacetate, with acetonitrile as the preferred organic solvent.

The novel monomers of the invention can be introduced into aqueous paint and coating formulations by interpolymerization in emulsions comprising vinyl ester systems which may also contain one or more other unsaturated monomers. Thus, such systems may comprise vinyl acetate alone or in admixture with one or more alkyl esters of acrylic and/or maleic acid or with ethylene. Such emulsion systems generally comprise, in addition to the polymerizable monomer or monomers, free radical initiators and emulsifying, stabilizing and surface active agents. Preferably, the activator comprises a redox system, typically made up of a peroxide or persulfate catalyst and a reducing component such as an alkali metal formaldehyde bisulfite. The principal emulsifying agent is preferably of the non-ionic type, for example, one or more alkyl phenoxy poly(oxyethylene) ethanols. The formulation may also include surface active agents of the anionic type and suitable buffering agents.

One of the standard procedures available for testing wet adhesion of a subject composition to a surface of semigloss paint is set out in Federal Specifications TT-P-001511, paragraph 4.3.9 (GSA-FSS). In this test, a panel is painted with an alkyd enamel of specified composition and permitted to dry under specified conditions. The test paint is then applied over the alkyd surface and dried. A cut is then made through the center of the test film and the panel scrubbed under water at a specified rate of brush travel. To pass the test, there must be no loss of adhesion between the test paint and the alkyd undercoat and no wearing through to the undercoat in fewer than 5,000 cycles.

Submitted to the foregoing test, films formed of vinyl acetate copolymer based paint emulsions containing about 2% (by weight of copolymer) of interpolymerized allyl-1-(2-aminoethyl) ethylene ureido succinamate (Formula V) show satisfactory wet adhesion, whereas similar painted films which do not incorporate this additive have poor adhesion and fail in the scrub test.

The adhesion qualities of a subject latex composition may also be tested by a so-called "cheesecloth peel test". In this test a cheesecloth is laid over a dried surface previously painted with a glossy alkyd enamel. The paint or coating composition to be tested is then applied to the surface through the cheesecloth and permitted to dry. The test is performed after wetting the coated surface with water for about two hours. The pull force required to peel the cheesecloth from the surface and the extent of alkyd enamel pulled up by the cloth measure the adherence quality of the overcoat. When about 2% or less of the monomers of the invention are interpolymerized into vinyl acetate copolymer emulsion systems, these impart excellent wet adhesion to alkyd surfaces as determined by the foregoing test, whereas similar compositions which do not incorporate the added monomer show only poor adhesion.

In addition to their use as interpolymerized monomers to improve the water resistance of coatings based on vinyl acetate copolymer emulsions, the monomer compounds of the invention may be employed as such or as intermediates in resin modifiers, plasticizers, textile sizes, corrosion inhibitors, softeners for cellulosic and synthetic fabrics, antistatic agents and wet strength paper resins.

What is claimed:

1. Compounds of the structural formula:

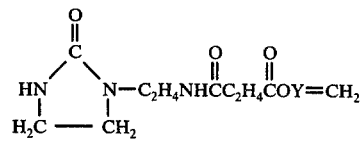

wherein Y is

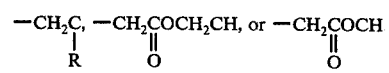

and R is H or CH$_3$.

2. The compound according to claim 1: wherein Y is

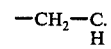

3. The compound according to claim 1 wherein Y is

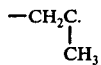

4. The method of synthesizing compounds corresponding to claim 2, which comprises reacting with an allyl halide the potassium salt of the amido succinic acid adduct obtained by reacting succinic anhydride with 2-aminoethyl ethylene urea.

5. The method according to claim 4 wherein the said reaction is carried out with allyl chloride in dimethyl formamide solvent.

6. The method according to claim 5 wherein the reaction with allyl chloride is carried out in the presence of an alkali metal halide catalyst.

7. The method according to claim 6 wherein the catalyst is KBr.

8. The method according to claim 4 wherein said reaction is carried out with allyl bromide in acetonitrile solvent.

9. The method of synthesizing compounds corresponding to claim 3 which comprises reacting with methallyl chloride the potassium salt of the adduct obtained by reacting succinic anhydride with 2-aminoethyl ethylene urea.

10. Aqueous emulsions of vinyl ester polymer systems comprising as an interpolymerized component conferring enhanced wet adhesion properties, the compound of claim 2.

11. The compound of the structural formula:

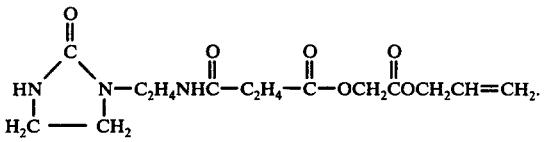

12. The compound of the structural formula:

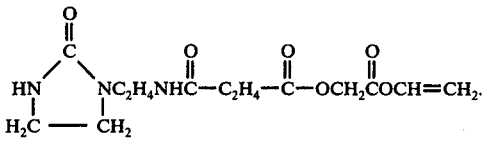

* * * * *